United States Patent [19]

Schwemmer et al.

[11] Patent Number: 5,396,973
[45] Date of Patent: Mar. 14, 1995

[54] VARIABLE SHOCK ABSORBER WITH INTEGRATED CONTROLLER, ACTUATOR AND SENSORS

[75] Inventors: Leonard J. Schwemmer; Paul T. Wolfe; Robert H. Majoram; Gary R. Denton, all of Erie

[73] Assignee: Lord Corporation, Erie, Pa.

[21] Appl. No.: 792,842

[22] Filed: Nov. 15, 1991

[51] Int. Cl.⁶ .......................... F16F 9/46; B60G 11/26
[52] U.S. Cl. .................................. 188/299; 280/707; 340/440; 340/461; 340/525; 364/424.03
[58] Field of Search ............... 280/707, 708; 188/299, 188/319, 322.12; 340/438, 440, 461, 525; 364/424.03, 424.04

[56] References Cited

U.S. PATENT DOCUMENTS

| | | | |
|---|---|---|---|
| 2,661,159 | 12/1953 | Winslow | 60/52 |
| 2,667,237 | 1/1954 | Rabinow | 188/88 |
| 2,669,325 | 2/1954 | Raines | 188/1 |
| 2,846,028 | 8/1958 | Gunther | 188/88 |
| 2,973,969 | 3/1961 | Thall | 280/124 |
| 3,006,656 | 10/1961 | Schaub | 280/112 |
| 3,059,915 | 10/1962 | Kemelhor | 267/1 |
| 3,174,587 | 3/1965 | Walton | 188/87 |
| 3,477,665 | 11/1969 | Legrand | 244/17.25 |
| 3,807,678 | 4/1974 | Karnopp et al. | 248/358 R |
| 4,054,295 | 10/1977 | Elliott | 280/707 |
| 4,310,172 | 1/1982 | Claude et al. | 280/707 |
| 4,317,105 | 2/1982 | Sinha et al. | 340/438 |
| 4,351,515 | 9/1982 | Yoshida | 267/8 R |
| 4,491,207 | 1/1985 | Boonchanta et al. | 188/299 |
| 4,576,258 | 3/1986 | Spisak et al. | 188/299 |
| 4,591,186 | 5/1986 | Ashiba | 188/299 |
| 4,606,440 | 8/1986 | Buchanan, Jr. et al. | 188/319 |
| 4,673,194 | 6/1987 | Sugasawa | 280/707 |
| 4,679,377 | 7/1987 | Rieben et al. | 53/327 |
| 4,696,489 | 9/1987 | Fujishiro et al. | 280/707 |
| 4,714,272 | 12/1987 | Buma et al. | 280/707 |
| 4,720,087 | 1/1988 | Duclos et al. | 267/140.1 |
| 4,726,453 | 2/1988 | Obstfelder et al. | 280/707 |
| 4,729,459 | 3/1988 | Inagaki et al. | 188/299 |
| 4,733,758 | 3/1988 | Duclos et al. | 188/267 |
| 4,747,474 | 5/1988 | Kimura et al. | 188/299 |
| 4,756,549 | 7/1988 | Kurosawa et al. | 280/707 |
| 4,770,438 | 9/1988 | Sugasawa et al. | 280/707 |
| 4,772,407 | 9/1988 | Carlson | 252/74 |
| 4,788,489 | 11/1988 | Kobayashi et al. | 280/707 |

(List continued on next page.)

FOREIGN PATENT DOCUMENTS 0036008 2/1986 Japan ......................... 280/707

OTHER PUBLICATIONS

Atkinson, P., *Feedback Control Theory for Engineers*, Plenum Publishing Corporation, New York, 1968, pp. 146–156.

DS-7023, Lord Corporation, "Heavy Duty Computer Controlled Chassis Damper", Nov. 1991.

*Primary Examiner*—Karin L. Tyson
*Assistant Examiner*—Paul N. Dickson
*Attorney, Agent, or Firm*—Randall S. Wayland; Richard K. Thomson; James W. Wright

[57] ABSTRACT

A variable shock absorber assembly of the adaptive or semi-active type or an active actuator wherein the actuator, sensors, electronic controller and valving are integral to and integrated into one assembly and comprise one compact integral unit. Feedback control provides a signal proportional to and indicative of the actuator position and velocity. The compact system is temperature compensated by incorporating temperature sensors into the integrated assembly. The integrated system also provides diagnostics integral to the assembly and an LED mounted on the assembly for providing a visual indication of system condition.

26 Claims, 6 Drawing Sheets

U.S. PATENT DOCUMENTS

| | | | |
|---|---|---|---|
| 4,817,922 | 4/1989 | Hovance | 267/64.21 |
| 4,821,849 | 4/1989 | Miller | 188/280 |
| 4,830,398 | 5/1989 | Williams et al. | 280/707 |
| 4,836,342 | 6/1989 | Wolfe | 188/319 |
| 4,838,392 | 6/1989 | Miller et al. | 188/277 |
| 4,838,574 | 6/1989 | Baraszu | 280/707 |
| 4,867,475 | 9/1989 | Groves | 280/707 |
| 4,875,560 | 10/1989 | Imaizumo | 188/319 |
| 4,881,172 | 11/1989 | Miller | 364/424.05 |
| 4,896,752 | 1/1990 | Shtarkman | 188/299 |
| 4,896,754 | 1/1990 | Carlson et al. | 192/21.5 |
| 4,902,034 | 2/1990 | Maguran et al. | 280/707 |
| 4,906,970 | 3/1990 | Momura | 340/438 |
| 4,907,680 | 3/1990 | Wolfe et al. | 188/299 |
| 4,921,272 | 5/1990 | Ivers | 280/707 |
| 4,923,038 | 5/1990 | Lizell | 188/299 |
| 4,923,057 | 5/1990 | Carlson et al. | 188/378 |
| 4,936,425 | 6/1990 | Boone et al. | 188/299 |
| 4,942,947 | 7/1990 | Shtarkman | 188/267 |
| 4,943,087 | 7/1990 | Groves et al. | 280/707 |
| 4,948,163 | 8/1990 | Kikushima et al. | 280/707 |
| 4,949,573 | 8/1990 | Wolfe et al. | 73/118.1 |
| 4,961,483 | 10/1990 | Yamoaka et al. | 188/299 |
| 4,993,523 | 2/1991 | Schwemmer et al. | 188/299 |
| 4,995,635 | 2/1991 | Guy | 280/707 |
| 5,024,460 | 6/1991 | Hanson et al. | 280/707 |
| 5,103,397 | 4/1992 | Ikemoto et al. | 280/707 |
| 5,200,895 | 4/1993 | Emura et al. | 280/707 |
| 5,242,190 | 9/1993 | Morris | 280/707 |

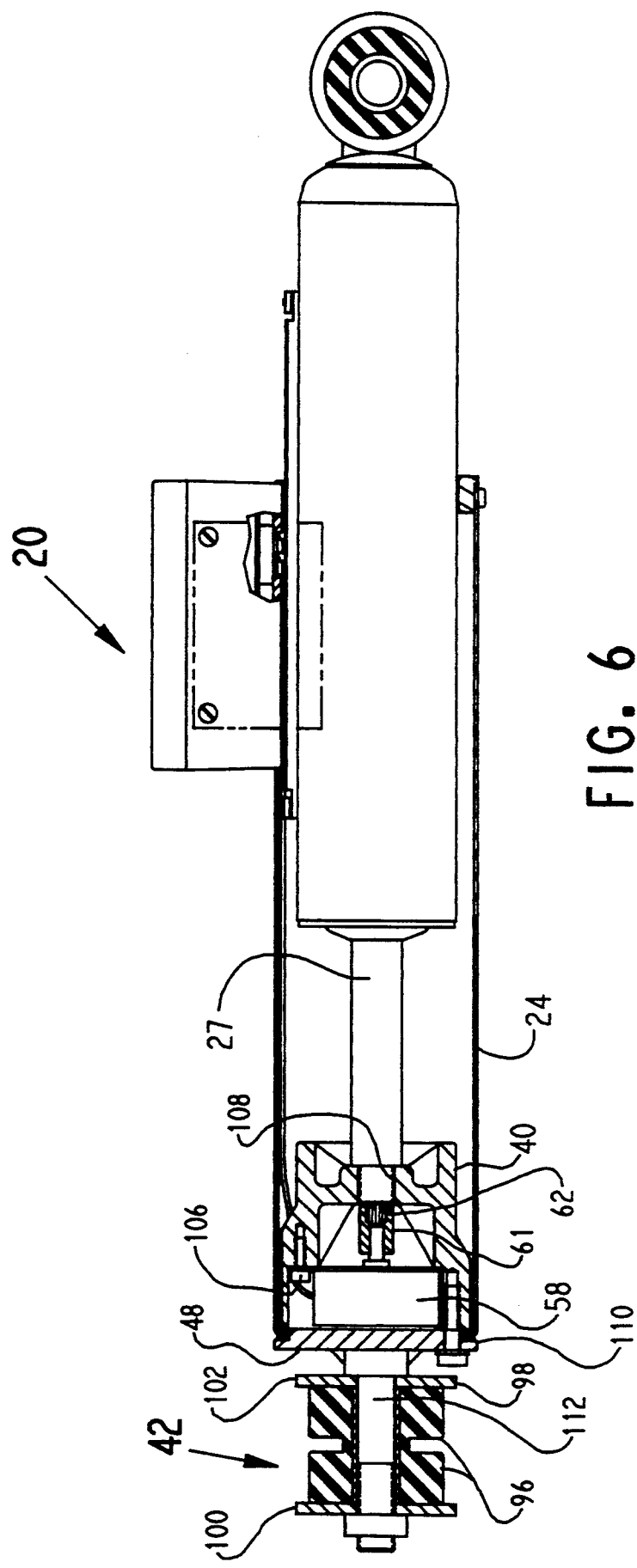

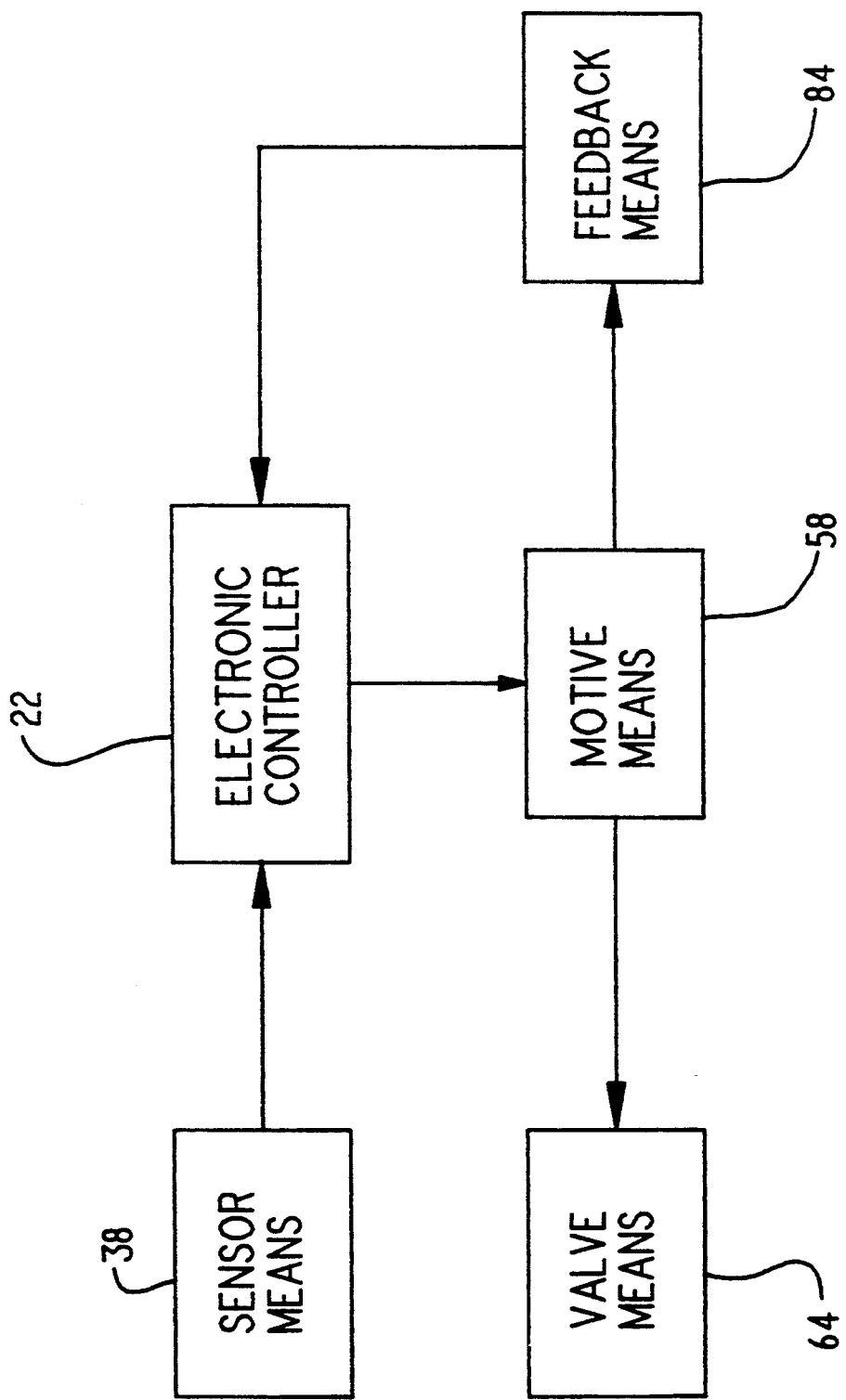

VARIABLE SHOCK ABSORBER WITH INTEGRATED CONTROLLER, ACTUATOR AND SENSORS

FIELD OF THE INVENTION

The invention relates to the area of variable dampers, commonly known as variable shock absorbers or active actuators for reducing the transmission of energy between two components. Specifically, the invention relates to adaptive or semi-active shock absorber assemblies, or active actuators for connection between two relatively moving components which provide for a reduction of the transmission of vibratory and impact forces imparted between the components.

Background of the Invention

Controllable systems, that is systems including adaptive and semi-active shock absorbers and active actuators for connection between components, for example between vehicle components, have been in development for many years. An adaptive shock absorber can adjust the flow of shock absorber fluid between the internal fluid chambers of the shock absorber in a slow fashion, such that a slow change in the shock performance is realized. Such shocks are known as "driver-selectable shock absorbers" and can typically be set for a variety of ride conditions such as a touring mode or SOFT setting, or a sport mode or HARD setting, or some setting in between which will provide intermediate ride conditions. Adaptive systems can also incorporate automatic changes to damping such as in response to vehicle speed changes, cornering, or changes in road conditions. Adaptive systems are slow response systems, with valve settings that change in a time frame on the order of seconds (approximately 50 milliseconds or greater). Such systems are currently available on some production automobiles.

The next generation of controllable systems were the fully active systems, as described in U.S. Pat. No. 3,477,665 to Legrand. Such active systems have the capability of adding energy into the system at selected times in order to reduce the transmission of vibratory energy. In these active systems, hydraulic power is supplied to a hydraulic actuator(s) to generate forces in response to motions of the system or to an external control input. These systems use controllers centralized in the vehicle and distributed sensors on the vehicle chassis for measuring the parameters relating to the movements of the suspension system components. Such active systems are costly.

More recently, semi-active systems have been developed which are a compromise between the slow response of the adaptive systems and the high cost of the fully active systems. A semi-active shock absorber has the capability of rapidly (in approximately 50 milliseconds or less) and precisely varying the damping level of the shock absorber from a high level of damping or "ON state" to a low level of damping or "OFF state" or to some intermediate state such as in continuous control, whereby in all aforementioned states, the damping state for any input condition is predetermined according to a control policy. By varying the damping characteristics of the shock absorber as a function of the input condition, such as relative or absolute displacement, velocity or acceleration, some of which is described in the commonly assigned U.S. Pat. No. 3,807,678 issued to Karnopp et al., the vibrational energy and shock transmissibility of the system can be dramatically reduced.

The semi-active shock absorber provides a mechanism by which the damping between two bodies can be changed in real time. This real time control enables the system to selectively provide the optimum amount of damping for each portion of the extension or compression stroke of the shock absorber. Effectively, this change in damping is accomplished by varying the fluid flow through a valve in the damper, thus throttling the fluid as it flows between the variable volume chambers of the shock absorber. In this manner, a system which incorporates a semi-active shock absorber improves over both the standard passive shock absorber and the adaptive shock absorber by providing the appropriate amount of damping for each input condition detected in real time.

In an adaptive or semi-active damper, one way the fluid flow can be varied is by means of a valve mechanism. Current systems use valves of the linear acting or rotational acting variety. Examples of controllable valves can be found in the commonly assigned U.S. Pat. No. 4,491,207 to Boonchanta et al., U.S. Pat. No. 4,836,342 to Wolfe and U.S. Pat. No. 4,993,523 to Schwemmer et al., which are all herein incorporated by reference. These valve assemblies provide the means for restricting the fluid flow between the variable volume chambers of the shock absorber. The variable valve is generally comprised of a passage which is opened or closed in response to a motive force from a motive means such as a stepper motor, gear motor, solenoid, or coil and magnet arrangement.

The prior art teaches of several means of providing the motive force needed to power the real time movement of the valve assembly. One such means is taught in the commonly assigned '207 to Boonchanta et. al., wherein a voice coil mechanism is used for varying the valve position from an ON to an OFF state. These voice coil mechanisms are simple ON/OFF devices and have only the two valve position settings. Other motive means include integrating the voice coil into the body of the shock absorber or shock body as taught in the '342 patent to Wolfe and as taught in the commonly assigned U.S. Pat. No. 4,838,392 to Miller et al. herein incorporated by reference. The motive means can also be added on top the shock absorber, as is taught in U.S. Pat. Nos. 4,747,474 to Kimura et al. and U.S. Pat. No. 4,875,560 to Imaizumo.

All the current and prior art systems require a signal indicative of the relative or absolute displacement, velocity, acceleration, or some other parameter of the components in the system. This signal is received from a sensor means by the control system or controller.. The control system, in turn, calculates and provides the appropriate signal to the motive means. This signal from the control system will bring about a change in the motive means and thus bring about a change in the variable position valve. This can be done in a slow manner such as in an adaptive sense, or in a fast or real time sense, such as in a semi-active system. In fact, many types of sensors have been used to provide a signal indicative of, or proportional to, the movements of the vehicle components. The commonly assigned U.S. Pat. No. 4,949,573 to Wolfe et al., herein incorporated by reference, teaches the use of a passive electrical coil-and-magnet type transducer for supplying a voltage signal proportional to relative velocity. U.S. Pat. No.

4,729,459 to Inagaki and U.S. Pat. No. 4,961,483 to Yamaoka et al. describe a piezoelectric type sensor for providing a direction-dependent signal proportional to force, and U.S. Pat. No. 4,995,635 to Guy, describes an ultrasonic Doppler velocity sensor for providing relative velocity information across the shock absorber. In the case of active actuators such as hydraulic, electromagnetic, electrotheological (ER), and magnetorheological (MR), they require the same input signals indicative of the movement of the components in the system or of the loads applied to the system.

For adaptive and semi-active shock absorbers, many types of motive power devices have been used to vary the valve position within the shock absorber. U.S. Pat. No. 4,948,163 describes a piezoelectric actuator for moving the damping valve to its ON and OFF states. U.S. Pat. No. 4,943,083 to Groves et al. and U.S. Pat. No. 4,923,038 to Lizell, describe internalized solenoid members for actuating the valve arrangement to the respective ON and OFF states. Whereas, U.S. Pat. No. 5,024,460 to Hanson et al. and U.S. Pat. No. 4,902,034 to Maguran et al., describe electrically controlled valve assemblies mounted on the side of the shock absorber. Generally, the systems described as being driver-selectable adaptive systems use a piston-rod mounted gear motor as described in U.S. Pat. No. 4,756,549 to Kurasawa et al. to In each of the abovementioned cases, a control means provides a command signal to the motive means to actuate the valve assembly to a specified position, either on/off or to some position intermediate. In the case of semi-active systems which have intermediate settings, the fast acting valves of the prior art tend to overshoot the valve position to which they are commanded, and thus will provide a damping value higher than is required.

Semi-active shock absorbers are controlled by control systems. These control systems or controllers are comprised of hardware such as circuit boards, microprocessors, memory chips such as EPROMs or RAM, power inputs and regulators, A/D and D/A converters, and operational amplifiers. Together, these components are arranged to form an electronic controller which receives a signal supplied by the aforementioned sensor means which is indicative of absolute or relative deflection, velocity, or acceleration of the system and then, based on the condition that is being sensed, the control algorithm commands the motive means to actuate the valve assembly to a new valve position setting or new damping load. In the simplest case, a low-damped setting would be "full OFF" or open and a high-damped setting would be "full ON" or closed. All of the following commonly assigned U.S. Pat. No. 3,807,678 to Karnopp et al.; U.S. Pat. No. 4,821,849 to Miller; U.S. Pat. No. 4,881,172 to Miller; U.S. Pat. No. 4,921,272 to Ivers; and U.S. Pat. No. 4,936,425 to Boone; describe control means and methods useful for semi-active shock absorbers and all are herein incorporated by reference.

The prior art systems all use a common centralized controller located on the vehicle chassis or body or distributed controllers on the vehicle chassis. U.S. Pat. No. 4,673,194 and U.S. Pat. No. 4,770,438, both issued to Sugasawa, describe controllable automotive suspension systems with centralized controllers. U.S. Pat. No. 4,714,272 to Buma et al. and U.S. Pat. No. 4,867,475 to Groves both describe controllable automotive suspension systems with centralized controllers and with sensors distributed on the chassis. These prior art references fail to provide a package which is "unitary", which can be easily installed or "bolted on" and, in fact, teach away from an integrated or integral damper or actuator package.

SUMMARY OF THE INVENTION

Accordingly, in view of the prior art, it is a primary objective of the present invention to provide a controllable shock absorber assembly or actuator assembly wherein the electronic controller is mounted on, and is integral with, the shock absorber assembly or actuator assembly. This integrated concept reduces the electromagnetic interference (EMI) of the circuitry, allows for an easily installed or retrofittable assembly, reduces the wiring requirements, increases reliability, and reduces cost.

It is another objective to provide an integrated shock absorber assembly, wherein the electronic controller, sensors, motive means, and valve means are all integrated into the shock absorber assembly. Thus, the shock absorber comprises an unitary, and compact assembly which only needs to be "bolted on", and plugged into a power supply.

Further, it is another objective to provide means which provides feedback information on the valve or motor position, velocity or acceleration, thereby avoiding overshoot of the valve position and resulting in more precise damping control than provided by the prior art devices.

Another objective is to locate some of the sensors, such as Hall effect sensors, accelerometers and/or thermocouples, on the circuit boards contained within the integrated electronic controller, thus providing several inexpensive and integrated sensor options for providing information about the relative and absolute position, velocity and acceleration and temperature of the system.

It is another objective to provide an integrated semi-active or adaptive shock absorber whereby the motive means is integrated into the dust cover, thus providing a sealed and corrosion resistant unit which is less susceptible to rock or stone strikes and utilizes less external wiring.

It is yet another objective to provide an integrated damper which will adapt its performance for changes in temperature by adjusting the nominal valve position in response to a change in environmental temperature sensed by the shock absorber assembly.

It is a further object to provide a controllable damper with integrated diagnostics and an LED for signaling diagnostic codes, thereby giving a direct visual output of the condition of each shock absorber assembly.

The abovementioned and further objects, features and advantages of the present invention will become apparent from the accompanying descriptions of the preferred embodiments and attached drawings.

BRIEF DESCRIPTION OF THE DRAWINGS

The accompanying drawings which form a part of the specification, illustrate several key embodiments of the present invention. The drawings and description together, serve to fully explain the invention. In the drawings.

FIG. 6 is a side view of another embodiment of the integrated shock absorber assembly showing a split bushing as the third attachment means and illustrating the integrated hall effect sensor arrangement; and FIG. 7 is a block diagram illustrating the interaction of the elements of the integrated shock absorber assembly.

DETAILED DESCRIPTION OF THE INVENTION

Figure 1:
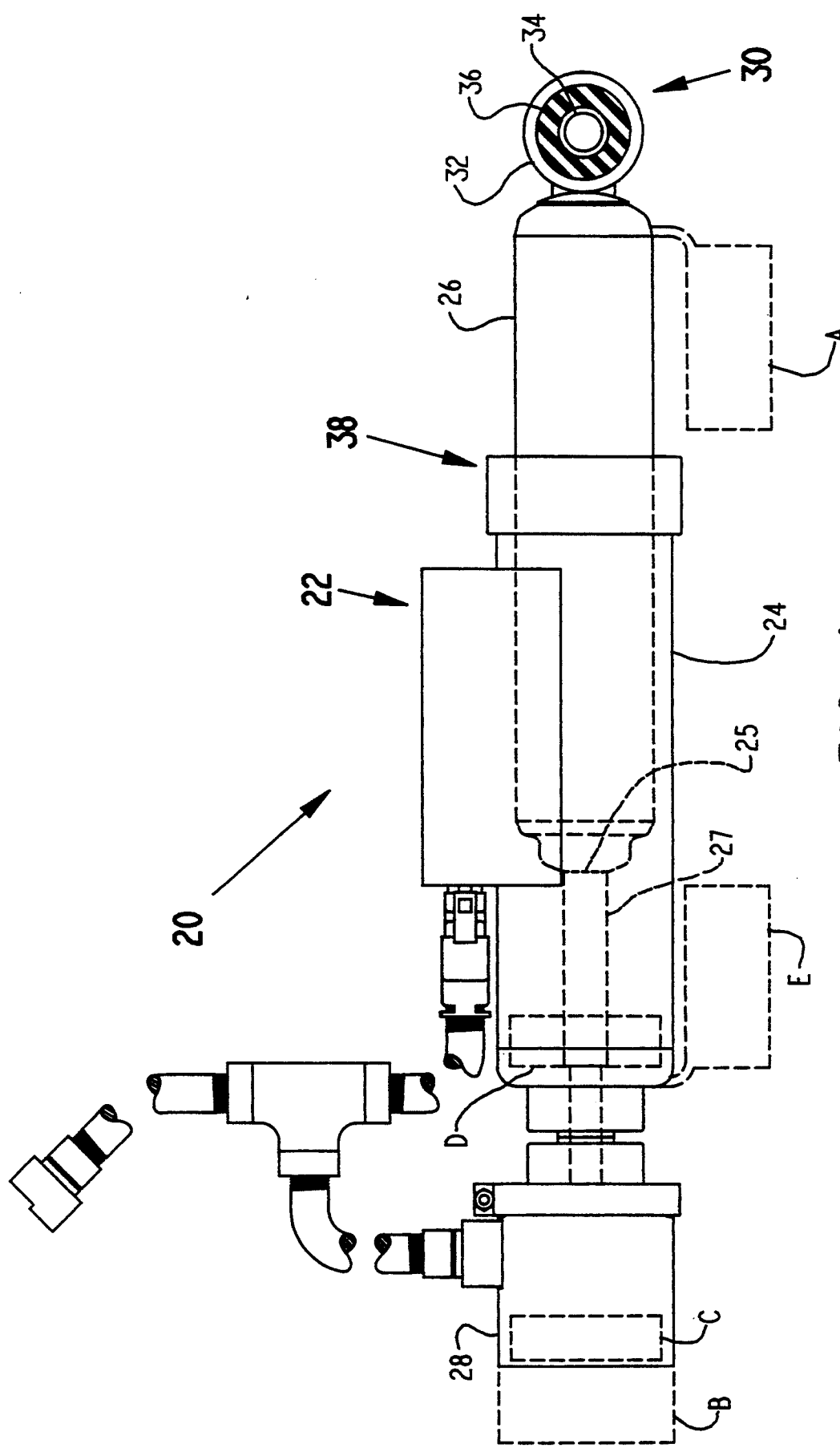
FIG. 1 is a side view of a first embodiment of an integrated shock absorber assembly illustrating the integrated electronic controller, motive means and sensor means.

The following detailed description illustrates an integrated shock absorber assembly 20 also commonly referred to as an integrated hydraulic electro-mechanical damper assembly. However, the integrated approach and concepts described below can be used on any type of controllable damper, actuator, spring or mounting. The shock absorber assembly 20 as shown in FIG. 1 illustrates a first embodiment of the present invention. As can be readily seen, one distinguishing feature of the present invention is the integrated electronic controller 22 which is integral with, or in other words integrated into, the shock absorber assembly 20. This is a deviation from the centralized controllers used in the prior art. This embodiment of the integrated shock absorber assembly 20 is comprised of an electronic controller 22 integral to the assembly 20 for controlling the damper behavior or response, a dust cover 24 which has a preferably cylindrical shape and hollow with an open end for accepting a portion of a shock body 26 within the cavity. The dust cover 24 reduces the exposure of the shock seals to debris, thus increasing damper life. The shock body 26 is preferably cylindrical and houses the controllable valve means 64 (FIG. 2) for varying the flow of the shock fluid. The shock assembly 20 has a piston rod 27 for connecting to the dust cover 24 and to the damping element and, which extends into and out of the shock body 26 by way of aperture 25. The aperture 25 is needed for sealing the piston rod 27 and for slidably accepting the piston rod 27 such that the shock fluid does not escape.

The aperture means 25 is located on the opposite end of the shock body 26 from the first attachment means 30. Also attached, is a housing 28 for protecting the valve actuating mechanism which is disposed within the housing 28. Although the controller 22 is shown attached to the dust cover 24, the assembly could be attached to any one of the ghosted positions including the shock body 26 as labeled A, the top of the housing 28 as labeled B, inside the housing 28 as labeled C or within the dust cover 24 as labeled D, or otherwise depend from the shock absorber assembly 20 as labeled E.

Some possible uses of the shock absorber assembly 20 include attachment between a vehicle suspension's components and chassis such as on a truck, bus, automobile, trailer, aircraft such as in aircraft landing gear, helicopters, military vehicles, motorcycles, snowmobile, ATV or other vehicles, or attachment between a vehicle body and chassis such as on a truck cab suspension system, or on any piece of equipment which has a need for controlling vibration, such as mining equipment, logging equipment, and rolling mills. The shock absorber assembly 20, in its usage, attaches to a first component (not shown) by first attachment means 30, such as a resilient bushing or eye which is attached to the shock body 26 by welding or other suitable means. The first attachment means 30, as shown, is comprised of an outer member 32 of circular shape, an inner member 34 of tubular shape, and a cylindrical bushing 36 of resilient material, such as rubber or urethane interspersed therebetween, or a nylon and fabric lining or reduced friction material interspersed therebetween inner member 34 and outer member 32.

Figure 2:
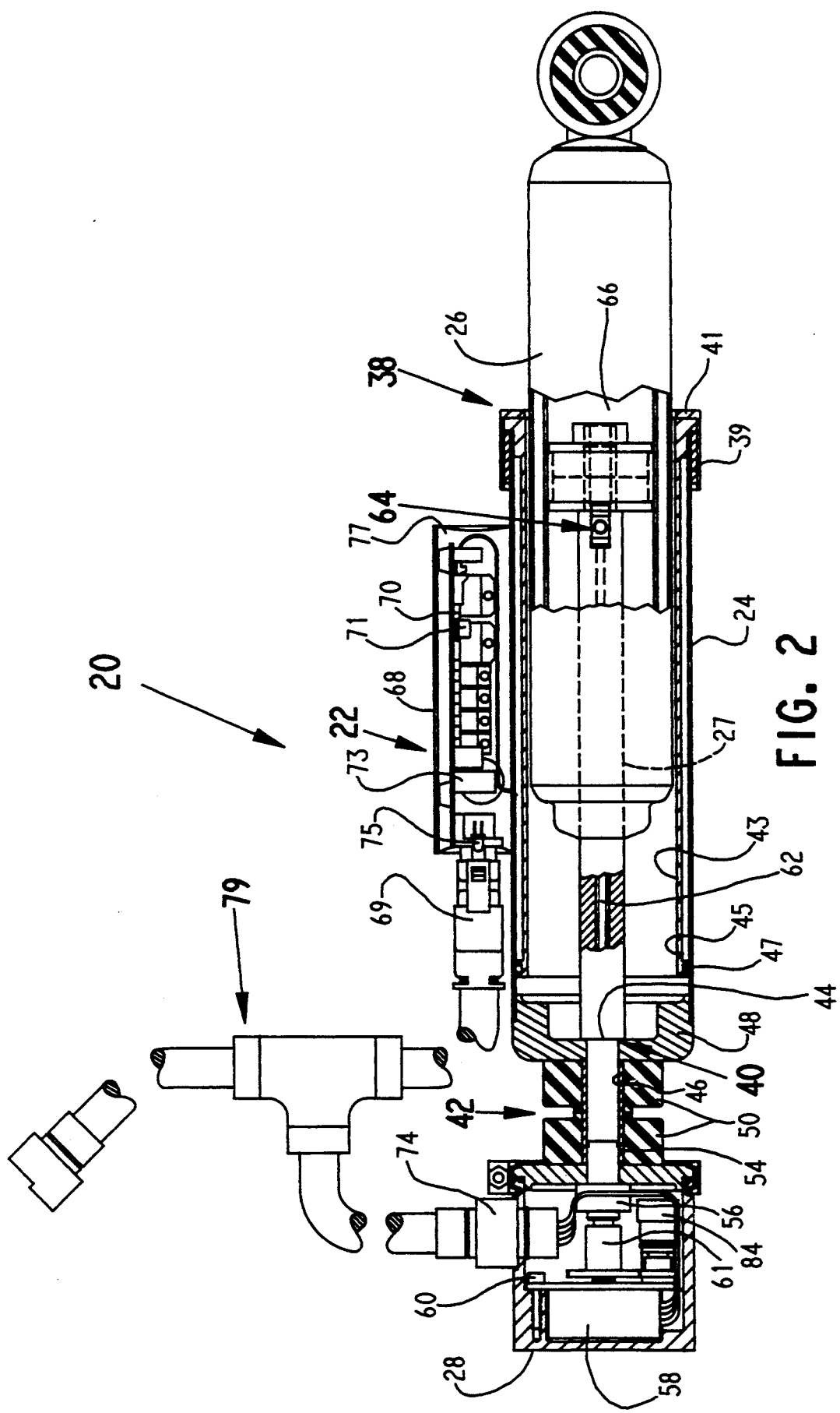
FIG. 2 is a detailed partial sectioned side view of the first embodiment of the integrated shock absorber assembly.

The dust cover 24 may, also, have integrated into it, the sensor means 38, such as the coil and magnet arrangement described in the aforementioned '573 patent to Wolfe, which is herein incorporated by reference. As best seen in FIG. 2, the sensor means 38, which is integrated into the shock absorber assembly 20, is comprised of a magnet 39 preferably of the strip type for providing a magnetic field, a pole piece 41 of ferromagnetic material for directing the magnetic field, a sleeve member 43 preferably of non-magnetic material upon which the coil of conductive windings 45 such as copper wire, are wrapped, and sealing means 47 such as an o-ring for sealing the coil windings 45 against damage from the adverse environment. Other sealing means such as potting material or sealant can be used as well. The sensor means 38 which is integrated into the shock absorber assembly 20 is used to provide a signal proportional to any of the following: absolute displacement, relative displacement, absolute velocity, relative velocity, relative acceleration and absolute acceleration, force or internal pressure, as further described, hereafter.

Any number of sensor means 38 can provide these signals. As shown in FIG. 7, a block diagram illustrates the interaction of the sensor means 38 with the electronic controller 22. Relative displacement between the components can be provided by sensors such as linear variable displacement transducers (LVDT's), Hall effect sensors, or a once-integrated velocity signal. Absolute displacement of any component can be obtained by twice integrating the signal from an accelerometer. Also, relative velocity can be obtained from hall effect sensors, coil-and-magnet type sensors as in the aforementioned '573 Wolfe patent, linear velocity transducers (LVT's), and ultrasonic sensors. Absolute velocity can be obtained from a once integrated accelerometer signal. Finally, relative acceleration can be obtained by subtracting the acceleration signals of the two components attached to the absorber assembly 20, while absolute acceleration of the components can be received directly from the accelerometer. Accelerometers can be of the piezoelectric type, or hybrid solid state type. In addition to motion-type sensors, the sensor means 38 can measure the force acting on, or pressure acting within, the shock absorber assembly 20. Force sensors can be placed anywhere integral to the shock absorber assembly 20 where force can be measured, such as in line with the piston rod. Force sensors include standard load cells, strain gages, ring-type load cells and piezoelectric load cells. Pressure sensors can be fitted within the variable volume chambers of the shock absorber assembly 20 and measure the internal pressures within these chambers. These pressures can then be used for control. Pressure sensors include solid state pressure sensors, piezoelectric pressure sensors, and film-type pressure sensors. All of the abovementioned sensor means 38 or combinations thereof can be integrated into the shock absorber assembly 20.

In the embodiment of FIG. 2, the second attachment means 40 is provided for attaching the dust cover 24 to the piston rod 27. Third attachment means 42 is provided for attaching the other end of the shock absorber assembly 20 to a second component (not shown), such as a vehicle chassis or body, or piece of equipment. The second attachment means 40 is comprised of a step 44 formed on the piston rod 27, such that the smaller diameter of the step 44 registers in a bore 46 formed on the closed end 48 dust cover 24 and the larger diameter of step 44 is urged into clamped relation with the closed end 48 of the dust cover 24. The third attachment means 42 for attaching to the second component (not shown) is comprised of a resilient split bushing 50, a tubular spacer 54 and threaded nut 56. The threaded nut 56, when engaged on the threaded end of the piston rod 27, urges the tubular spacer 54 into contact with the closed end 48 of the dust cover 24 and also into contact with the bottom of the housing 28, thus leaving the appropriate amount of precompression on the resilient split bushing 50. The housing 28 is also fastened to the piston rod 27 in this manner. Accordingly, the resilient split bushing 50 can engage an attachment bracket on the second vehicle component (not shown) and provide a small degree of articulation, or ability to cock. The split bushing can be made of any resilient material, such as rubber or urethane.

As shown in FIG. 2, the motive means 58 in this embodiment is shown as a stepper motor which is integrated into the shock assembly 20. However, other motive means 58, or source of force to move the valve 64, can be readily used, such as a solenoid (rotary or linear), linear actuators, coil and magnet arrangements such as voice coil mechanisms, DC motors, and piezoelectric actuators. Many of these motive means 58, such as the voice coil, piezoelectric and solenoids, can be built into or integrated into the shock body 26 rather than being located near the top of the piston rod 27. In this embodiment, the motive means 58 which is a stepper motor, is attached to the housing 28 by attachment means 60, such as bolts. The integrated stepper motor is attached to a moveable control rod 62 by way of an attachment means 61 such as a coupler. The coupler 61 torsionally locks the motor output shaft to the control rod 62, yet allows for axial misalignment. The control rod 62 is actuated by the motive means 58 within a hollow space within the piston rod 27, while the other end of the control rod 62 is attached to a multiple position controllable valve 64. Any inputs to the system will result in a signal being emitted by the sensor means 38. In turn, the electronic controller 22 will respond with a command to rotationally actuate the motive means 58. The movement will rotationally actuate the valve 64 and vary the flow of the fluid 66 within the shock absorber assembly 20. This causes a change in the damping level of the shock absorber assembly 20. This change can be adaptive (slow), that is, on the order of seconds or, semi-active (fast), on the order of milliseconds.

In the FIG. 2 embodiment, the electronic controller 22 is comprised of a controller housing 68 which is box shaped and is attached to the dust cover 24 by suitable means, such as welding, glueing, bolting or riveting. Within the confines of the housing 68 is a circuit board 70 containing the necessary circuitry for supplying power to the integrated shock absorber assembly, processing the signal inputs, controlling the motive means, and providing diagnostics. The circuit board 70 also receives the voltage-proportional input signals from the at least one sensor means 38. The sensor means 38 may be integrated into the electronic controller 22. For example, an accelerometer or thermocouple may be added on the electronic controller 22 or attached to some other portion of the shock absorber assembly 20 as well.

Diagnostic capability of the condition of the shock absorber assembly 20 is provided by way of an LED 75 for providing a visual indication of faults, maximum excursions, or for warnings of scheduled maintenance for the shock absorber assembly 20. In addition, the LED 75 can be used for blinking out error codes. The LED 75 can be attached to the circuit board 70 or elsewhere on the shock absorber assembly 20. Temperature compensation of the shock assembly 20 is provided by having temperature sensing means 73 such as thermocouples or thermisters integrated into the electronic controller 22. A variety of schemes could then be used to vary the shock assembly 20 performance in response to temperature changes. For example, a non-compensating shock may tend to get stiffer in cold weather due to damping fluid viscosity changes, resulting in a harsh ride or, it may have inadequate damping in hot weather. A compensated shock absorber can adjust for temperature changes, including the changes in the electronics, by further opening or closing the valve means 64.

The electronic controller 22 contains a first electrical connector 69 for connecting to the wire harness 79 which enables i) the sending of a signal to the motive means 58, ii) receiving the signal from a feedback means 84, and iii) receiving power for the system. Controller 22 also contains an accelerometer 71 built into the circuit board 70 or elsewhere on the shock absorber assembly 20 for providing an estimate of the absolute acceleration of the body. Connector 69 and a second electrical connector 74 are interconnected with wiring harness 79 which has the input leads attached for supplying the assembly 20 with power. In addition, these leads can be interconnected with other integrated shock absorber assemblies 20 within a system, such as on a vehicle, for providing cross-talk or information about the conditions imposed on the other integrated shock assemblies 20. By such an interconnection, roll and pitch can be controlled on a vehicle.

In this embodiment, the wiring is external, therefore requiring some means for connection between the motive means 58 and the electronic controller 22, such as the wiring harness 79. Other embodiments are shown wherein the wiring is all internal to the shock absorber assembly 20. In this first embodiment, the circuit board 70 is fastened to the controller housing 68 and then potting material 77 is poured all around the circuit board 70 to seal it completely and protect the sensitive electronic chips, sensors and connections.

Figure 3:
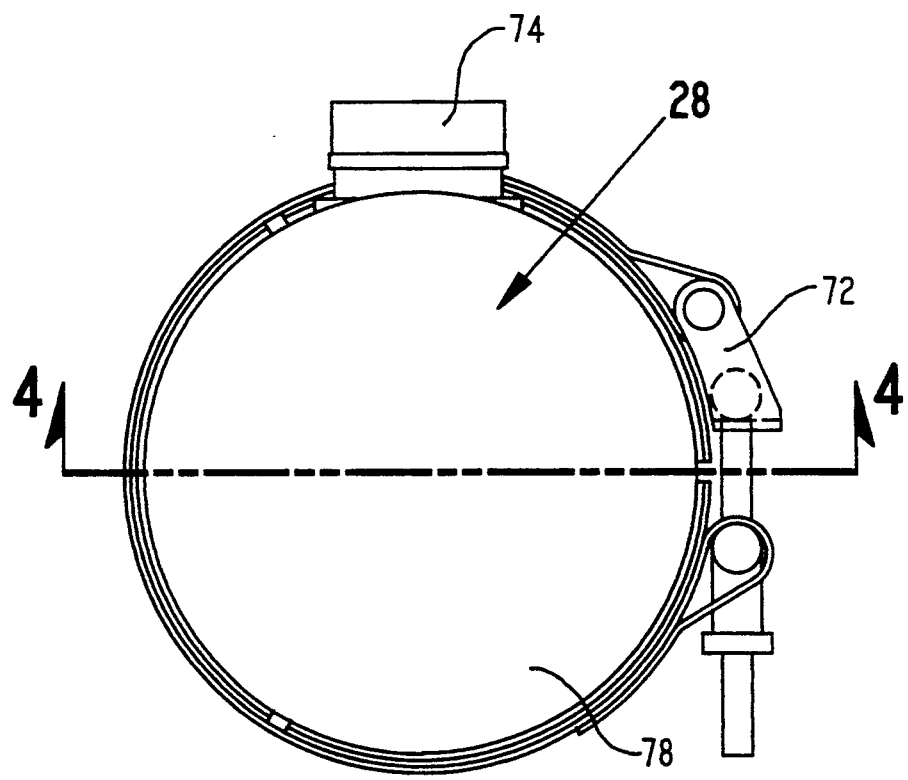
FIG. 3 is an enlarged top view of the motor housing assembly of the integrated shock absorber assembly.
Figure 4:
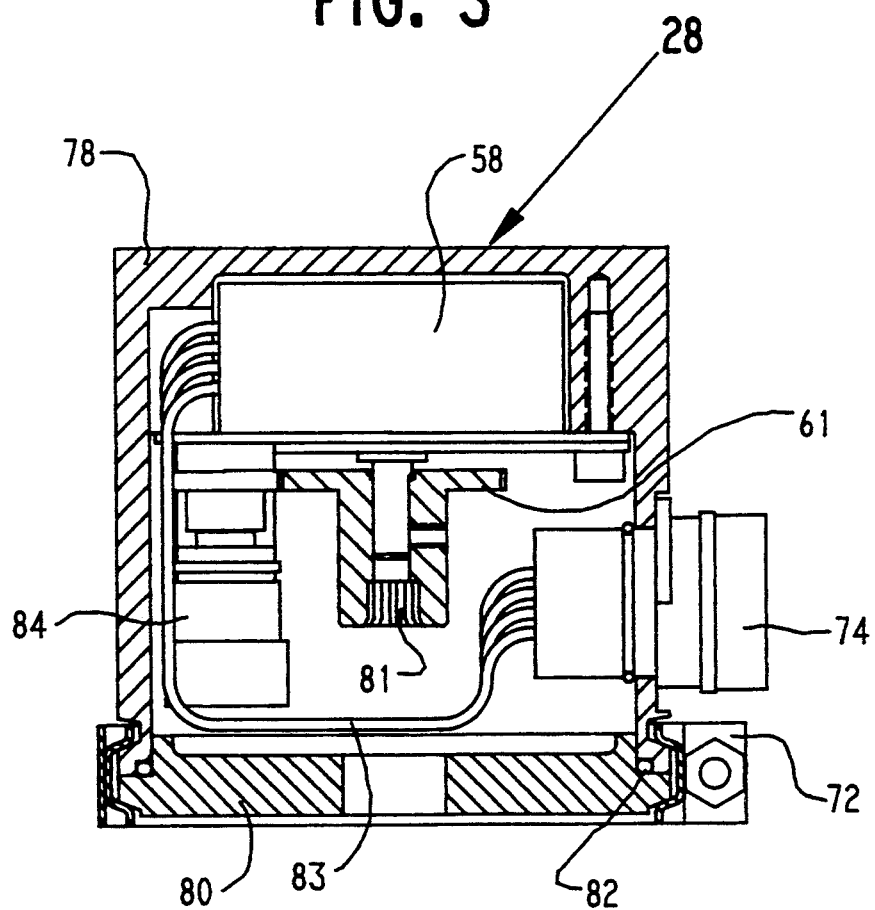
FIG. 4 is an enlarged partial sectioned side view of of the motor housing assembly of the integrated shock absorber assembly showing the motive means, feedback means, and the coupling.

FIG. 3 shows a top view of the anodized aluminum housing 28 for enclosing and attaching the motive means 58 (FIG. 4). The housing 28 further comprises a clamping means 72 for clamping a top housing portion 78 to the bottom housing portion 80 (FIG. 4) of the housing 28, and a electrical connector 74 for connecting to wiring harness 79. As shown in FIG. 4, the housing 28 is comprised of the two portions 78 and 80 which are sealed by seal 82 such as an O-ring. The two halves are damped together by clamping means 72, which is of strap-type construction. Upon tightening the clamping means 72, the forces exerted on the tapered surfaced of the two portions 78 and 80 urge the two sections towards one another and compress the seal 82.

The electrical connector 74 is sealingly connected to the upper housing portion 78 and provides the necessary electrical connection for supplying and receiving signals and power to the motive means 58 and feedback means 84. In this embodiment, the feedback means 84 is a gear-type potentiometer. However, it could be of any construction to provide a signal indicative of, or proportional to, the valve or motive means position or velocity, such as with an optical encoder, a Hall effect transducer, an RVDT (Rotational Variable Displacement Transducer), or similar devices. By providing a feedback signal to the electronic controller 22, the exact position of the motive means 58 and thus the valve means 64 can be detected. This feedback allows very precise positioning of the valve means 64 and thus eliminates overshoot of the valve means 64. Also shown is the coupling 61, for attaching the motive means 58 to the control rod 62 (FIG. 2). The coupling 61 is attached to the output shaft of the motive means 58, and in this case, has a gear formed thereon which meshes with a gear on the gear type potentiometer or feedback means 84. The motive means 58, the feedback means 84, and the connector 74 are all connected by wire bundle 83. The connector 74, in turn, connects to the wiring harness 79 which connects to the electronic controller 22 and the external power source. In this case, the torsional connection is made via splines 81 on both the end of the control rod 62 and on the coupling 61.

Figure 5:
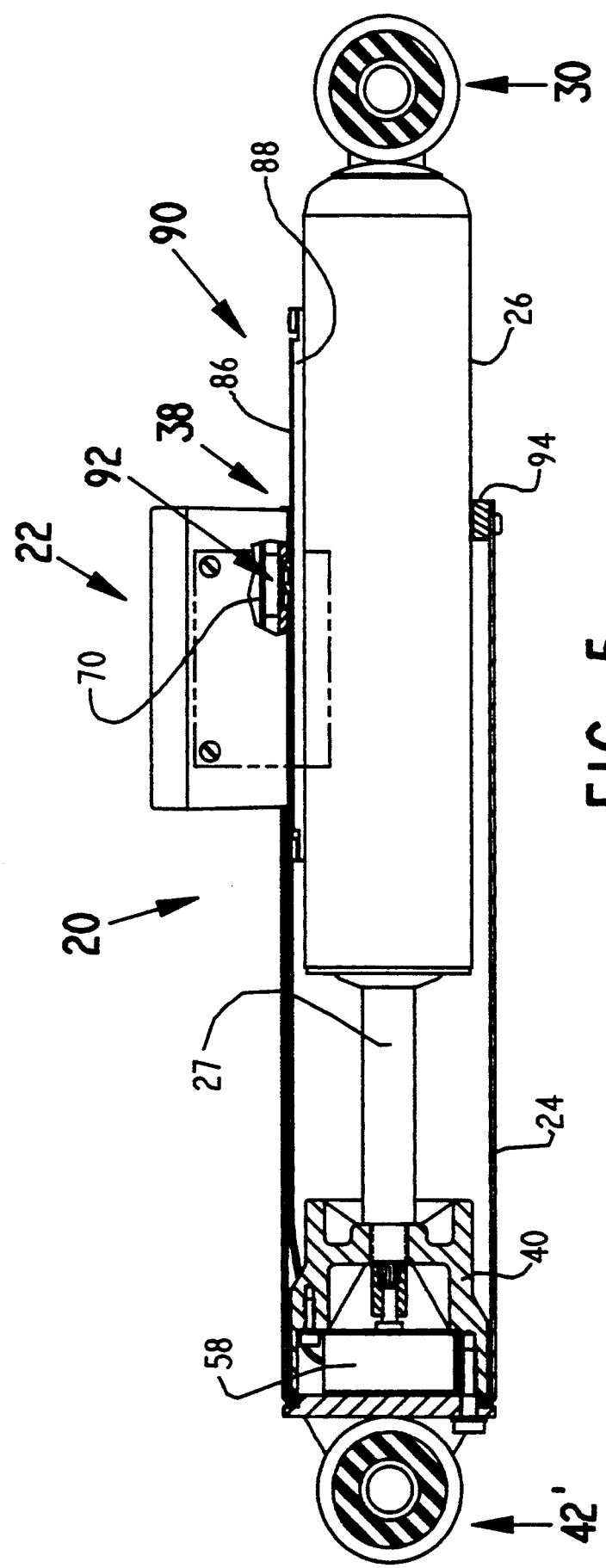
FIG. 5 is a side view of another embodiment of the integrated shock absorber assembly showing resilient bushings or eyes at both ends and motive means integrated into the dust cover.

Referring now to FIG. 5, whereby another embodiment of the integrated shock absorber assembly 20 is comprised of a first attachment means 30 similar to the embodiment of FIG. 1, the first attachment means 30 is a resilient bushing or eye attached to the shock body 26. Further, this embodiment also has integrated electronic controller 22 for receiving the signal indicative of relative or absolute displacement, velocity, acceleration, or force or internal pressure from an integrated sensor means 38 as was fully described above, and for providing a command signal for actuation of the integrated motive means 58. In this embodiment, the piston rod 27 is connected to the dust cover 24 by second attachment means 40, which is an intermediate member which transfers the shock loads into the dust cover 24 and then into the third attachment means 42'. In this embodiment, the third attachment means 42' is a resilient bushing or eye similar to 30 on the other end of the shock assembly 20.

The integrated shock absorber assembly 20 embodiment of FIG. 5, has an integrated electronic controller 22, an integrated motive means 58 and a sensor means 38. In this case, the sensor means 38 is a Hall effect sensor. This sensor is further comprised of a strip magnet 86 with a plurality of north-south poles aligned along the length of the magnetic strip 86. The magnetic strip 86 is then bonded to a metal strip 88 which, then, makes up the magnet assembly 90 and is bolted to the shock body 26. The metal strip 88 serves to protect the edges of the magnetic strip 86 from being damaged while extending and compressing the shock absorber assembly 20. At least two Hall effect sensors 92 are positioned on the circuit board 70 and integral to the controller 22 such that they are in close proximity to the magnetic strip 86, so that any movement of the sensors relative to the magnet will cause an analog or digital signal output. In this case, the integrated electronic controller 22 has a sealed lid to seal the circuit board 70 and is bolted to tabs on the dust cover 24 as opposed to the potting 77 used in the embodiment of FIG. 1. An annular nylon spacer 94 is bolted to the dust cover 24 and maintains the radial gap and also the alignment of the dust cover 24 in relationship to the shock body 26. The annular spacer 94 has a groove formed in it for slidably accepting the magnet assembly 90 and keeping the dust cover 24 from rotating relative to the shock body 26. This ensures the proper location of the magnet strip 86 to the hall effect sensors 92. A Hall effect sensor is described in U.S. Pat. No. 4,836,578 to Soltis, which is herein incorporated by reference.

Now referring to FIG. 6, another embodiment of the integrated shock absorber assembly 20 is shown with a split-bushing third attachment means 42 for attaching the assembly 20 to a second component (not shown). This embodiment attaches similarly to the first preferred embodiment of FIG. 1. The third attachment means 42 is comprised of a split resilient bushing 96 similar to item 50 of the first embodiment, first washer 98, second washer 100, and a tubular spacer member 102. Also shown in FIG. 6, the motive means 58 is integrated into the dust cover 24. The motive means 58 is attached to second attachment means 40 by way of attachment means 106, such as bolts. The piston rod 27 attaches to the second attachment means 40 by way of a threaded connection 108. The motive means 58 output shaft then attaches to the spline on the control rod 62 via the coupling 61. This connection enables the control of the valve means 64 (not shown). As mentioned earlier, the wiring to the motive means 58 and sensor means 38 is internal, as shown. A cap 110 has a stud 112 extending from it and is attached to the second attachment means 40. The cap 110 forms the closed end 48 of the dust cover 24, thus fully enclosing the motive means 58 within the dust cover 24.

Finally, in block diagram in FIG. 7, the function of the integrated shock absorber assembly 20 is described. The sensor means 38 which is integrated into the shock absorber assembly 20 detects one of the inputs described above, i.e., relative displacement, relative velocity, etc. and emits a signal to the integrated electronic controller 22. The electronic controller 22 then calculates or decides on, the appropriate command to send to the motive means 58, the various alternatives of which have been described in detail. The motive means 58 responds to the control command and moves rapidly toward the new damping setting. Since the feedback means is constantly sampling the position of the motor, the motive means 58 will actuate precisely to the required position and not overshoot. As a result, the valve means 64 will actuate precisely to the position required and not overshoot. This will enable the shock absorber assembly 20 to supply the precise amount of damping required for the input condition encountered.

Although the abovementioned hydraulic electromechanical shock absorber with integrated controls was illustrated, other dampers, actuators, springs and mountings could utilize the integrated concept as well. For example, an integrated controller can be advantageous on electrorheological (ER) fluid dampers. Electroreheological fluids and devices are taught in the commonly assigned U.S. Pat. No. 4,923,057 to Carlson et al., U.S. Pat. No. 4,896,754 to Carlson et al., U.S. Pat. No. 4,772,407 to Carlson and U.S. Pat. No. 4,720,087 to Duclos et al. and U.S. Pat. No. 4,733,758 to Duclos et al. all herein incorporated by reference. The integrated controller can also be advantageous on magnetorheological (MR) fluid dampers. Magnetorheological fluids and devices are taught in the following U.S. Pat. Nos. 4,942,947; 4,896,752; 4,351,515; 3,174,587; 3,059,915; 3,006,656; 2,973,969; 2,846,028; 2,669,325; 2,667,237; and U.S. Pat. No. 2,661,596 all of which are herein incorporated by reference. Finally, active actuators such as electro-magnetic actuators, and hydraulic electro-mechanical actuators can also benefit from having an integrated electronic controller.

While the preferred embodiments of the present invention have been described in detail, various modifications, alterations and changes and adaptations of the invention to springs, dampers, actuators, struts and mountings or the use of on combinations of the aforementioned may be made without departing from the spirit and scope of the present invention defined in the appended claims. In addition, in many cases, a dust cover may not be required on a shock absorber, yet the integrated approach could still be utilized. It is intended that all such modifications, alterations and changes be considered part of the present invention.

We claim:

1. A variable shock absorber assembly, comprising:
   a) a shock body with first attachment means on a first end of said shock body for attaching said shock body to a first component,
   b) said shock body having controllable valve means formed therein for varying the flow of a fluid,
   c) aperture means formed on an opposite end of said shock body from said first end, said aperture means provided for telescopically accepting a piston rod and sealingly retaining said fluid within said shock body,
   d) said piston rod having second attachment means also formed thereon for attaching said piston rod to a dust cover,
   e) said dust cover having a hollow cavity formed therein which telescopically accepts a portion of said shock body within said cavity,
   f) third attachment means for attaching said shock absorber assembly to a second component,
   g) motive means comprising a stepper motor integrated into said shock absorber for providing the force needed to move said controllable valve means,
   h) sensor means integrated into said shock absorber assembly for providing an input signal indicative of at least one of the group containing relative displacement between said first and second component, absolute displacement of said second component, relative velocity between said first and second component, absolute velocity of said second component, relative acceleration between said first and second component, absolute acceleration of said second component, internal pressure in said shock absorber assembly, and force exerted on said shock absorber assembly,
   i) an electronic controller for controlling damping behavior externally mounted on and integral to said shock absorber assembly for providing a control signal to said motive means responsive to said input signal;
   a gear-type potentiometer for determining and providing a feedback signal proportional to one from the group containing rotational position and rotational velocity of said motive means for allowing positioning of said valve means.

2. A variable shock absorber assembly in accordance with claim 1 wherein said stepper motor is enclosed within said dust cover.

3. A variable shock absorber assembly in accordance with claim 2 wherein said stepper motor rotates a control rod within said piston rod.

4. A variable shock absorber assembly in accordance with claim 1 wherein said stepper motor attaches to the end of said piston rod.

5. A variable shock absorber assembly, according to claim 1, further comprising:
   said fluid being selected from the group containing electrorheological (ER) fluid and magnetorheological (MR) fluid.

6. A variable shock absorber assembly in accordance with claim 1 wherein said motive means is a solenoid.

7. A variable shock absorber assembly in accordance with claim 1 wherein said motive means is a voice coil mechanism.

8. A variable shock absorber assembly in accordance with claim 7 wherein said voice coil mechanism is housed within said shock body.

9. A variable shock absorber assembly in accordance with claim 1 wherein said sensor means is further comprised of a coil of conductive wire and a magnet.

10. A variable shock absorber assembly in accordance with claim 1 wherein said first attachment means is a urethane bushing.

11. A variable shock absorber assembly in accordance with claim 1 wherein said second attachment means is further comprised of a step on said piston rod which is urged into contact with a closed end of said dust cover by a split bushing.

12. A variable shock absorber assembly in accordance with claim 1 wherein said third attachment means is a urethane bushing.

13. A variable shock absorber assembly in accordance with claim 1 wherein said third attachment means is comprised of a split urethane bushing.

14. A variable shock absorber assembly, comprising:
   a) a shock body with first attachment means on a first end of said shock body for attaching said shock body to a first component,
   b) said shock body having controllable valve means formed therein for varying the flow of a fluid,
   c) aperture means formed on an opposite end of said shock body from said first end, said aperture means provided for telescopically accepting a piston rod and sealingly retaining said fluid within said shock body,
   d) said piston rod having second attachment means also formed thereon for attaching said piston rod to a dust cover,
   e) said dust cover having a hollow cavity formed therein which telescopically accepts a portion of said shock body within said cavity,
   f) third attachment means for attaching said shock absorber assembly to a second component,
   g) motive means integrated into said shock absorber for providing the force needed to move said controllable valve means, h) sensor means integrated into said shock absorber assembly for providing an input signal indicative of at least one of the group containing relative displacement between said first and second component absolute displacement of said second component relative velocity between said first and second component absolute velocity of said second component relative acceleration between said first and second component absolute acceleration of said second component, internal pressure in said shock absorber assembly and force exerted on said shock absorber assembly, i) an electronic controller for controlling damping behavior externally mounted on and integral to said shock absorber assembly for providing a control signal to said motive means responsive to said input signal, said electronic controller being integral with said dust cover.

15. A variable shock absorber assembly, according to claim 14, wherein said fluid is selected from the group containing electrorheological (ER) fluid and magnetorheological (MR) fluid.

16. A variable shock absorber assembly comprising:

a) a shock body with first attachment means on a first end of said shock body for attaching said shock body to a first component, b) said shock body having controllable valve means formed therein for varying the flow of a fluid, c) aperture means formed on an opposite end of said shock body from said first end said aperture means provided for telescopically accepting a piston rod and sealingly retaining said fluid within said shock body, d) said piston rod having second attachment means also formed thereon for attaching said piston rod to a dust cover, e) said dust cover having a hollow cavity formed therein which telescopically accepts a portion of said shock body within said cavity, f) third attachment means for attaching said shock absorber assembly to a second component, g) motive means integrated into said shock absorber for providing the force needed to move said controllable valve means, h) sensor means integrated into said shock absorber assembly for providing an input signal indicative of at least one of the group containing relative displacement between said first and second component absolute displacement of said second component, relative velocity between said first and second component, absolute velocity of said second component, relative acceleration between said first and second component, absolute acceleration of said second component, internal pressure in said shock absorber assembly, and force exerted on said shock absorber assembly, said sensor means being positioned on and built into a circuit board of said electronic controller for controlling damping behavior: and i) an electronic controller for controlling damping behavior externally mounted on and integral to said dust cover of said shock absorber assembly for providing a control signal to said motive means responsive to said input signal.

17. A variable shock absorber assembly in accordance with claim 16 wherein said sensor means is at least one accelerometer is positioned on and is built into said circuit board of said electronic controller for controlling damping behavior.

18. A variable shock absorber assembly in accordance with claim 16 wherein said sensor means is at least two Hall effect sensors positioned on and built into said electronic controller for controlling damping behavior.

19. A variable shock absorber assembly, according to claim 16, wherein said fluid is selected from the group containing electrorheological (ER) fluid and magnetorheological (MR) fluid.

20. A variable shock absorber assembly, comprising:

a) a shock body with first attachment means on a first end of said shock body for attaching said shock body to a first component, b) said shock body having controllable valve means formed therein for varying the flow of a fluid, c) aperture means formed on an opposite end of said shock body from said first end, said aperture means provided for telescopically accepting a piston rod and sealingly retaining said fluid within said shock body, d) said piston rod having second attachment means also formed thereon for attaching said piston rod to a dust cover, e) said dust cover having a hollow cavity formed therein which telescopically accepts a portion of said shock body within said cavity, f) third attachment means for attaching said shock absorber assembly to a second component, g) motive means integrated into said shock absorber for providing the power needed to move said controllable valve means, h) a sensor means integrated into said shock absorber assembly for providing an input signal indicative of at least one of the group containing relative displacement between said first and second component, absolute displacement of said second component, relative velocity between said first and second component, absolute velocity of said second component, relative acceleration between said first and second component, absolute acceleration of said second component, internal pressure in said shock absorber assembly and force exerted on said shock absorber assembly, i) an electronic controller for controlling the damping behavior externally mounted on and integral to said shock absorber assembly for providing a control signal to said motive means responsive to said input signal, and j) diagnostic means integrated into said shock absorber assembly for providing diagnostic analysis of the condition of said shock absorber assembly by blinking out error codes through an LED integral to and attached to an external portion of said shock absorber.

21. A variable shock absorber assembly, comprising: diagnostic means integrated into a shock absorber for providing diagnostic analysis of the condition of the shock absorber via blinking out at least one from the group consisting of error codes, maximum excursions, and maintenance warnings through an LED integral to and attached to an external portion of said shock absorber.

22. A variable shock absorber assembly, comprising:

a) a cylindrical shock body with a first resilient bushing formed upon a first end of said shock body for attaching said cylindrical shock body to a first vehicle component;

b) aperture means formed on an opposite end of said cylindrical shock body from said first end, said aperture means provided for telescopically accepting a piston rod during extension of said shock absorber assembly and sealingly retaining a fluid within said cylindrical shock body;

c) said shock body having controllable valve means capable of multiple position settings formed therein for varying the flow of said fluid d) means for attaching said piston rod to a dust cover;

e) said dust cover having a hollow cavity formed therein which accepts a portion of said shock body within said cavity;

f) a second resilient bushing for attaching said dust cover to a second vehicle component;

g) a motive means for providing the motive force needed to move said controllable valve means, said motive means integrated into said shock absorber assembly;

h) a sensor means integrated into said dust cover for providing a sensor signal proportional to at least one of the group containing relative displacement, and relative velocity of said first and second vehicle components;

i) electronic controller for controlling damping behavior integrated into a housing attached to a side of said dust cover for providing a control signal to said motive means responsive said sensor signal.

23. A variable shock absorber assembly, according to claim 22, wherein said fluid is selected from the group containing electrorheological (ER) fluid and magnetorheological (MR) fluid.

24. A shock absorber assembly, comprising:

an electronic controller for controlling damping behavior externally mounted on and integral with a shock absorber for processing an input signal and providing a control signal to said shock absorber responsive to said input signal, a temperature sensing means integrated into, and attached to an external portion of, said electronic controller wherein the shock absorber is temperature compensated to vary the damping dependent on the ambient temperature.

25. A variable shock absorber assembly, comprising:

a) a shock body with first attachment means on a first end of said shock body for attaching said shock body to a first component, b) said shock body having controllable valve means formed therein for varying the flow of a fluid, c) aperture means formed on an opposite end of said shock body from said first end, said aperture means provided for telescopically accepting a piston rod and sealingly retaining said fluid within said shock body, d) said piston rod having second attachment means also formed thereon for attaching said piston rod to a dust cover, e) said dust cover having a hollow cavity formed therein which telescopically accepts a portion of said shock body within said cavity, f) third attachment means for attaching said shock absorber assembly to a second component, g) motive means integrated into said shock absorber for providing the force needed to move said controllable valve means, h) a sensor means integrated into said shock absorber assembly for providing an input signal indicative of at least one of the group containing relative displacement between said first and second component, absolute displacement of said second component, relative velocity between said first and second component, absolute velocity of said second component, relative acceleration between said first and second component, absolute acceleration of said second component, internal pressure in said shock absorber assembly and force exerted on said shock absorber assembly, i) an electronic controller for controlling damping behavior externally mounted on and integral to said shock absorber assembly for providing a control signal to said motive means responsive to said input signal, j) said shock absorber assembly is temperature compensated to vary the damping dependent on the ambient temperature and a temperature sensing means is integrated into, and attached to an external portion of, said electronic controller.

26. A variable shock absorber assembly, according to claim 25, wherein said fluid is selected from the group containing electrorheological (ER) fluid and magnetorheological (MR) fluid.

* * * * *